Patented Oct. 12, 1954

2,691,584

UNITED STATES PATENT OFFICE 2,691,584

STABILIZATION OF SYNTHETIC POLYMER SENSITIZED ZINC LITHOGRAPHIC PRINTING PLATES

James G. Smith and Louis M. Minsk, Rochester, N. Y., assignors to Eastman Kodak Company, Rochester, N. Y., a corporation of New Jersey No Drawing. Application January 12, 1952, Serial No. 266,236

3 Claims. (Cl. 95—8)

This invention relates to the preparation of stabilized synthetic polymer sensitized zinc plates useful for preparing lithographic printing plates and more particularly to such plates sensitized with cinnamic acid esters of polyvinyl alcohol.

In the Minsk et al. U. S. Patent application Serial No. 148,684, filed March 9, 1950, now U. S. Patent 2,610,120, granted September 9, 1952, and the Minsk et al. U. S. Patent applications Serial Nos. 207,048–52, filed January 20, 1951, are described methods for the preparation of light sensitive cinnamic acid esters of polyvinyl alcohol and the sensitizing of compositions containing such esters with various compounds such as nitroaryl, quinone, anthrone, and triphenylmethane compounds and diamino diphenyl carbinol, diamino diphenyl methane and diamino diphenyl ketone compounds. Such light sensitive esters are disclosed as useful in the preparation of resist images on metal plates such as zinc plates for printing purposes. In such usage the light sensitive compositions are coated from solvent onto a metal surface and are exposed under the desired subjects such as a continuous tone, line or half-tone subject followed by removal from the plate of the unexposed regions to yield a light hardened resist image on the metal surface.

We have have discovered that in general solvent solutions of the light sensitive polymeric cinnamic acid esters are stable and in the absence of light do not undergo insolubilization, and generally when the compositions are coated on various surfaces do not become insoluble in the absence of light. However, when the compositions are coated on zinc plates, initially, within a period of about 24 hours, satisfactory resist images can be formed on the zinc plates by the above method but after about 24 hours it is found that even in the dark, the zinc plates apparently have sufficiently catalyzed the insolubilization of the resin immediately adjacent to the surface of the zinc plate that the quality of the printing plate is decreased. This effect is particularly noticeable when the cinnamic acid esters of polyvinyl alcohol which were used in coating the zinc plate have been especially sensitized with the above mentioned compounds. In the case where grained zinc plates had been utilized apparently the effect is manifest by the formation of a very thin stratum of insoluble reaction product (resin or other substance) on the surface of the plate which is not readily removed in the unexposed areas which should repel the printing ink, but which now tend to attract the ink. In the case where etched zinc plates are being prepared by forming the resist on the zinc surface followed by etching out those areas not occupied by the resist, the effect of the presence of the insoluble reaction product on the surface of the zinc is to impede the etching process. Consequently, the quality of prints obtained from such zinc printing plates progressively decreases with increase in age of the polymer coated zinc plate.

The mechanism of the reaction at the surface of the zinc plate is not evident. It was noted that the surface reaction was greatest when there were employed the most carefully purified samples of cinnamic acid esters of polyvinyl alcohol from which substantially all free cinnamic acid had been removed during the synthesis of the resin. This was substantiated by addition of quantities of cinnamic acid to the highly purified cinnamic acid esters with the result that appreciable decrease in the reaction at the surface of the zinc plate was observed. However, the greatest improvement in quality of zinc lithographic printing plates resulted when insolubilization inhibitor compounds such as those having a reducing action, for example, hydroquinone or other polyhydric phenol reducing compounds, were added to the cinnamic acid ester compositions alone or in conjunction with an aromatic or aliphatic acid such as cinnamic acid in an amount sufficient to prevent the insolubilization reaction at the surface of the zinc plate. Other methods investigated measurably decreased the undesirable reaction at the surface of the zinc plate but not nearly as much as did the mentioned inhibitor compounds known to have reducing activity. These methods included depositing a silver coating from a silver nitrate solution onto the surface of the zinc plate before application of the light sensitive resin composition thereto, or adding to the light sensitive coating a soluble copper compound such as copper acetoacetate, copper acetyl acetonate or copper ethylene bisaminoacetyl acetonate.

Representative insolubilization inhibitor compounds which are useful in the cinnamic acid ester compositions for the mentioned purposes of our invention are phenolic compounds and aromatic amines having reducing activity such as the mono and polyhydric phenols such as hydroquinone, catechol, resorcinol, o-tert.butyl-p-methoxy phenol, phenyl-$\beta$-naphthylamine, p-hydroxyphenylmorpholine, and various phenylenediamines such as p-phenylenediamine. These compounds can be used in the cinnamic acid ester compositions, particularly in the mentioned especially sensitized compositions, alone or in admixture with each other or in conjunction with substantially non-volatile aliphatic and aromatic acids such as cinnamic, benzoic, phenylacetic, hydrocinnamic, chloracetic, salicylic and crotonic acids, as will be seen by consideration of the following examples illustrating our invention. As mentioned the inhibitor compounds are particularly effective when used in conjunction with cinnamic acid esters of polyvinyl alcohol sensitized with the nitro-aryl, quinone, anthrone, etc. sensitizing agents of the mentioned patent applications. Compounds such as picric acid and a variety of other nitro compounds, known to inhibit polymerization of unsaturated compounds, do not prevent the insolubilization reaction at the surface of the zinc plate. Such compounds increase the light-sensitivity of the polymeric coatings but tend to promote the mentioned insolubilization reaction.

*Example 1*

A cinnamic acid ester of polyvinyl alcohol is prepared by the methods of the Minsk application Serial No. 207,052 above, such as by esterification of substantially fully de-esterified polyvinyl alcohol with cinnamoyl chloride. The resulting polyvinyl cinnamate resin is then dissolved in a suitable solvent such as three parts of toluene and one part of methyl glycol acetate in a concentration of about 2.5 percent. There is then added to the solution a sensitizing agent such as 1,2,-benzanthraquinone or p,p'-tetramethyldiaminobenzophenone in a concentration of from about 2–25 percent based on the weight of polymer present. There is then added to this solution an amount of the insolubilization inhibitor for the ester sufficient to prevent the formation only in the dark of the insoluble reaction product on the surface of the zinc plate, that is, in a concentration of the order of about 1–10 percent based on the weight of polymer present. Hydroquinone is particularly suitable for this purpose. When the resulting compositions are coated on to zinc plates and allowed to age in the absence of light, it is found that after several weeks virtually no reaction which impaired the usefulness of the sensitized plates for making zinc printing plates by the described methods, had taken place at the surface of the zince plate.

The following compositions are illustrative of the use of mixtures of organic acids and the phenolic inhibitor compounds for preventing the formation of the insoluble reaction product adjacent to the surface of zinc plates sensitized with cinnamic acid esters of polyvinyl alcohol.

*Example 2*

2.5 grams polyvinvyl cinnamate
0.25 gram 1,2-benzanthraquinone
0.20 gram cinnamic acid
0.05 gram hydroquinone
75 cc. xylene
25 cc. methylglycol acetate (2-methoxy ethyl acetate)

*Example 3*

2.5 grams polyvinyl cinnamate
0.25 gram 1,2-benzanthraquinone
0.30 gram cinnamic acid
0.05 gram hydroquinone
75 cc. xylene
25 cc. methylglycol acetate

*Example 4*

2.5 grams polyvinyl cinnamate
0.25 gram p,p'-tetramethyldiaminobenzophenone
0.20 gram cinnamic acid
0.025 gram hydroquinone
75 cc. xylene
25 cc. methylglycol acetate

*Example 5*

2.5 grams polyvinyl cinnamate
0.25 gram p,p'-tetramethyldiaminobenzophenone
0.025 gram hydroquinone
0.25 gram benzoic acid
0.05 gram cinnamic acid
75 cc. xylene
25 cc. methylglycol acetate

*Example 6*

2.5 grams polyvinyl cinnamate
0.25 gram 2,4,6-trinitroaniline
0.20 gram cinnamic acid
0.05 gram hydroquinone
75 cc. xylene
25 cc. methylglycol acetate

*Example 7*

[For use as a coating on photoengraver's zinc.]

7.5 grams polyvinyl cinnamate
0.75 gram p,p'-tetramethyldiaminobenzophenone
0.075 gram hydroquinone
0.90 gram cinnamic acid
100 cc. methylglycol acetate

*Example 8*

25 cc. methylglycol acetate
75 cc. toluene
2.5 grams polyvinyl cinnamate
0.25 gram p,p'-tetramethyldiaminobenzophenone
0.05 gram hydroquinone Compositions prepared as in the above examples and coated on zinc plates form no reaction product at the surface of the plate for at least six months. The composition of Example 8 which is free of organic acid, eventually is the first to show signs of instability on aging.

Other aliphatic and aromatic acids which may be used in conjunction with the insolubilization inhibitor compounds, particularly in conjunction with hydroquinone, are those indicated previously.

Other cinnamic acid esters of polyvinyl alcohol which may be utilized in the light sensitive compositions whether especially sensitized as indicated or not, are the solvent soluble light sensitive esters of partially or fully de-esterified polyvinyl esters containing from about 60 to 100 mol percent of a cinnamoyl ester group derived from any cinnamic acid, for example, o-chloro-cinnamic acid, m-nitrocinnamic acid, $\alpha$- and $\beta$-phenylcinnamic acids as described in application Serial No. 207052.

Polyvinyl cinnamate, as the term is used herein is to be understood as meaning a solvent soluble light sensitive ester of polyvinyl alcohol containing from about 60 to 100 mol percent of combined $$-CH_2-\overset{|}{C}H-O-CO-CH=CH-C_6H_5 \text{ groups}$$

What we claim is:

1. A light-sensitive photographic element comprising a zinc plate having coated thereon a mixture of polyvinyl cinnamate containing from about 60 to 100 mol percent of recurring polymeric units having the formula $$-CH_2-\overset{|}{C}H-O-CO-CH=CH-C_6H_5$$

and an amount of hydroquinone and an organic acid sufficient to prevent the formation only in the dark of insoluble reaction product immediately adjacent to the surface of the zinc plate.

2. A light-sensitive photographic element comprising a zinc plate having coated thereon a mixture of polyvinyl cinnamate containing from about 60 to 100 mol percent of recurring polymeric units having the formula $$-CH_2-\overset{|}{C}H-O-CO-CH=CH-C_6H_5$$

and an amount of hydroquinone and cinnamic acid sufficient to prevent the formation only in the dark of insoluble reaction product immediately adjacent to the surface of the zinc plate.

3. A light-sensitive photographic element comprising a zinc plate having coated thereon a mixture of polyvinyl cinnamate containing from about 60 to 100 mol percent of recurring polymeric units having the formula $$-CH_2-\overset{|}{C}H-O-CO-CH=CH-C_6H_5$$

sensitized to light with p,p′-tetramethyldiaminobenzophenone, and an amount of hydroquinone and cinnamic acid sufficient to prevent the formation only in the dark of insoluble reaction product immediately adjacent to the surface of the zinc plate.

References Cited in the file of this patent

UNITED STATES PATENTS

| Number | Name | Date |
|---|---|---|
| 1,587,274 | Beebe et al. | June 1, 1926 |
| 2,063,348 | Seymour | Dec. 8, 1936 |
| 2,318,959 | Muskat et al. | May 11, 1943 |
| 2,610,120 | Minsk et al. | Sept. 9, 1952 |